(12) United States Patent
Vlachomitrou

(10) Patent No.: US 11,227,415 B2
(45) Date of Patent: Jan. 18, 2022

(54) METHOD FOR CREATING A COMPOSITE CEPHALOMETRIC IMAGE

(71) Applicant: Trophy, Atlanta, GA (US)

(72) Inventor: Anna-Sesilia Vlachomitrou, Paris (FR)

( * ) Notice: Subject to any disclaimer, the term of this patent is extended or adjusted under 35 U.S.C. 154(b) by 21 days.

(21) Appl. No.: 16/305,046

(22) PCT Filed: May 27, 2016

(86) PCT No.: PCT/IB2016/000794
§ 371 (c)(1),
(2) Date: Nov. 27, 2018

(87) PCT Pub. No.: WO2017/203316
PCT Pub. Date: Nov. 30, 2017

(65) Prior Publication Data
US 2020/0320749 A1    Oct. 8, 2020

(51) Int. Cl.
| | |
|---|---|
| G06T 5/00 | (2006.01) |
| G06T 11/00 | (2006.01) |
| G06T 7/50 | (2017.01) |
| G06T 5/20 | (2006.01) |
| G06T 5/50 | (2006.01) |
| G06T 7/00 | (2017.01) |

(52) U.S. Cl.
CPC ............ *G06T 11/003* (2013.01); *G06T 5/002* (2013.01); *G06T 5/20* (2013.01); *G06T 5/50* (2013.01); *G06T 7/0012* (2013.01); *G06T 7/50* (2017.01); *G06T 2207/10028* (2013.01); *G06T 2207/10072* (2013.01); *G06T 2207/10116* (2013.01); *G06T 2207/20021* (2013.01); *G06T 2207/20221* (2013.01); *G06T 2207/30036* (2013.01)

(58) Field of Classification Search
CPC ....... G06T 11/003; G06T 7/50; G06T 7/0012; G06T 5/002; G06T 5/20; G06T 5/50; G06T 2207/10028; G06T 2207/10072; G06T 2207/10116; G06T 2207/20021; G06T 2207/20221; G06T 2207/30036
See application file for complete search history.

(56) References Cited

U.S. PATENT DOCUMENTS

| | | | | |
|---|---|---|---|---|
| 2011/0123084 A1* | 5/2011 | Sebok | .................. | A61B 6/5264 382/132 |
| 2014/0205140 A1* | 7/2014 | Lovberg | .................. | G06T 7/246 382/103 |

FOREIGN PATENT DOCUMENTS

| | | |
|---|---|---|
| EP | 3 465 609 A1 | 4/2019 |
| WO | 2017/203316 A1 | 11/2017 |

OTHER PUBLICATIONS

Speidel Michael et al: "Scanning-beam digital x-ray (SBDX) technology for interventional and diagnostic cardiac angiography", Medical Physics, AIP, Melville, NY, US, vol. 33, No. 8, Jul. 14, 2006 (Jul. 14, 2006), pp. 2714-2727, XP012092201, ISSN: 0094-2405, DOI: 10.1118/1.2208736 (Year: 2006).*

(Continued)

*Primary Examiner* — Ping Y Hsieh

(57) ABSTRACT

A composite image (300) is created from a plurality of tomographic slices by creating a plurality of two-dimensional slice images by projecting the slices, dividing each slice image into tiles (302) according to a pattern (304), calculating a focus value for each tile (302) of each slice image, selecting one tile (302) for each position in the pattern having a highest focus measure value, and assembling the composite image (300) from said selected tiles (302).

6 Claims, 3 Drawing Sheets

(56) References Cited

OTHER PUBLICATIONS

Rusinol Marcal et al: "Combining Focus Measure Operators to Predict OCR Accuracy in Mobile-Captured Document Images", 2014 11th APR International Workshop on Document Analysis Systems, IEEE, Apr. 7, 2014 (Apr. 7, 2014), pp. 181-185, XP032606127, DOI: 10.1109/DAS.2014.11 (Year: 2014).*

International Search Report and Written Opinion received for PCT Application Serial No. PCT/IB2016/000794 dated May 30, 2017, 15 pages.

International Preliminary Report on Patentability received for PCT Application Serial No. PCT/IB2016/000794 dated Dec. 6, 2018, 12 pages.

\* cited by examiner

METHOD FOR CREATING A COMPOSITE CEPHALOMETRIC IMAGE

FIELD OF THE INVENTION

The present invention concerns a method for creating a composite cephalometric image from image data generated in a three-dimensional cephalometric scan.

BACKGROUND OF THE INVENTION

The 2D cephalometric radiograph is an imaging technique which produces a linear projection of a human head on a flat 2D sensor (or, in more general terms, an imaging layer of an imaging device).

Cephalometric analysis is a technique commonly employed by orthodontists, dentists, et al. to analyze the dimensional relationships in the craniofacial complex, to predict future changes, to assess the effect of ongoing treatment plans, to evaluate the patient's dentomaxillofacial proportions, and to aid in the diagnosis of abnormalities and asymmetries.

Consequently, there exists a need for a system which provides high-resolution cephalometric images.

A planar imaging system has two types of resolution: an in-plane spatial resolution, in the direction parallel to the imaging layer of the imaging device; and a depth resolution, perpendicular to the imaging layer of the imaging device.

The image depth resolution depends primarily on the width of the sensor along the direction of movement and the actual movement trajectory.

In the known extra-oral systems for performing panoramic imaging, the apparatus typically comprises a tall, narrow sensor which is disposed opposite an X-ray source with several meters of separation. The patient is placed between the two, and the source and sensor are panned linearly past the patient.

In the known extra-oral systems for performing panoramic imaging, the sensor is typically narrow in aspect, long and with a small width. In order to obtain a linear projection of the entire human skull (cephalometric image), the imaging system includes a cephalometric or "ceph" arm: the panoramic sensor is attached to the "ceph" arm in the cases where a cephalometric image is needed.

The two segments of the profile during which the skull is exposed to radiation are substantially linear. The length of the linear exposure is generally more than 5 cm, but in any case long enough to produce data that can be used to produce a volumetric reconstruction of an image to be displayed.

After the exposures, a volumetric reconstruction algorithm is used to calculate vertical slices along the imaging direction. The content of each individual slice is reconstructed using tomosynthesis techniques. The vertical slices are then transformed to eliminate different magnification factors of different vertical slices, and then added together to produce a 2D cephalometric image.

However, due to the use of a linear sensor with a small width, the voxels in the volumetric image provided by the sensor have a small size in the imaging dimension, and thus a high spatial resolution, but a large size in the perpendicular dimension, and thus a poor depth resolution.

Thus, a new, improved method of tomosynthesis utilizes an apparatus where a wide-aspect X-ray sensor and an X-ray source are closely-spaced (less than 1 meter) and follow a trajectory which is arcing rather than linear during the exposure sweep past the patient. This new method realizes a much greater depth resolution than the known methods.

However, this close spacing between the X-ray source and X-ray sensor can be problematic in certain cases. Specifically, the X-ray beam will necessarily be conically shaped. For any given slice, therefore, there will be portions of the image which are in focus, and other portions which are not in focus.

Moreover, different anatomical structures of interest may be located at different depths within the patient's anatomy, and therefore may not be present, or not in focus, in the same tomographic image slice.

There is therefore a need for a method for processing the data derived from the tomographic imaging process, which resolves at least partially the foregoing disadvantages.

SUMMARY OF THE INVENTION

In a first aspect, therefore, the invention is directed towards a method for creating a composite image from a plurality of tomographic slices oriented parallel to and at varying distances from a reference plane, comprising the steps of projecting each slice to create a plurality of two-dimensional slice images; dividing each slice image into a first set of tiles according to a pre-determined first tile pattern; calculating a focus value for each tile of each slice image; selecting, for each position of the first tile pattern, one of said first set of tiles having the highest focus value; and assembling the composite image from said selected tiles.

Such a method is advantageous in that the composite image is composed only of the portions of the tomographic slices which are more or most in-focus. As a result, the depiction of the anatomical details in the composite image is of an increased resolution or a uniformly-high resolution and quality, across the entire composite image.

In a possible embodiment, the focus value of each tile is equal to the mean of a Gaussian derivative criterion and a Tenengrad criterion of said tile.

This is advantageous in that determining the focus measure value in this way yields particularly good results when manipulating typical tomographic images.

Preferably, a first depth map is generated from depth values of the selected tiles constituting the composite image.

This is advantageous in that the depth map adds depth coordinates to the pixels of the composite image, allowing three-dimensional measurement and modeling from the composite image.

In a preferred embodiment, the method further comprises an enhancement step after the assembling step, the enhancement step comprising the sub-steps of smoothing discontinuities on the composite image; amending the first depth map to reflect the smoothed composite image; applying a cubic interpolation to the amended first depth map to produce a second depth map; extracting a second tile pattern from the second depth map; dividing each of the plurality of slices into a second set of tiles according to said second tile pattern; selecting, for each position in the second tile pattern, one of said second set of tiles according to the second depth map; and assembling an enhanced composite image from said selected tiles of said second set of tiles.

This is advantageous in that the depth map is further employed so as to produce a higher-quality composite image in a way that uses the first grid to reduce the additional expenditure of time and computing resources that would be implicated in simply starting with a second grid. The resulting enhanced composite image is thereby improved at a reduced or minimal extra cost.

In another preferred embodiment, the method further comprises an enhancement step for adding obscured anatomical features to the composite images, comprising the sub-steps of, for at least one slice image, applying an enhancement filter to the slice image to enhance anatomical features in said slice image, thereby producing a working image; removing pixels from the working image having a gradient magnitude below a mean gradient magnitude of said slice image; applying a noise filter to said working image, thereby obtaining a mask; applying a smoothing filter to smooth the edges of said mask; multiplying the mask and the slice image, thereby producing a contour image; and adding the contour image to the composite image.

This is advantageous in that it will add to the composite image anatomical features which might otherwise be discarded as being present in a different slice than the one retained for that portion of the composite image. In this way, a considerable amount of anatomical features of diagnostic and/or therapeutic importance are retained in the composite image.

In a possible embodiment, each at least one slice image contains at least one of a pre-determined set of anatomical features.

In this way, the enhancement method is only performed for a reduced or limited number of slice images. Since the pre-determined set of anatomical features may be constructed to include only those which are of particular interest, or likely to be obscured by the cephalographic process, the enhancement method can thus be configured to produce an enhanced composite image of increased or maximal quality and medical utility, while requiring a reduced or minimal of extra computational resources.

Preferably, the contour image for each slice comprises only pixels not present in the contour image of any other slice.

This is advantageous in that it prevents the degradation of superposed anatomical features in the composite image, in the form of e.g. blurring and over-magnification. The anatomical features thus remain in sharp focus.

Preferably, the noise filter is a morphological operation.

Such a noise filter is advantageous in that it is particularly well-adapted for the anatomical features present in the slices, and thus produces a mask corresponding to the anatomical features with a high degree of accuracy.

In a possible embodiment, at least one of the enhancement filter and smoothing filter is a Difference of Gaussians filter.

The usage of a Difference of Gaussians filter is advantageous, in that it accomplishes the enhancement and smoothing steps with a good balance between quality of the results and economy of computing resources.

In a possible embodiment, the reference plane is a plane of anatomical symmetry, the plurality of slices being situated on the same side of said reference plane.

This is advantageous in that it will avoid degradation or misrepresentation of anatomical features which are symmetrical across the reference plane. More specifically, when such features are present, only the one on the side of the reference plane which is scanned will be present in the composite image. Moreover, using a plane of anatomical symmetry as a reference plane facilitates the creation of bilateral images and three-dimensional models from the resulting composite image et al simply by juxtaposing composite images taken from either side of said plane of symmetry.

In a particular embodiment, the reference plane is the mid-sagittal plane.

Using the mid-sagittal plane as the reference plane is particularly advantageous in that the resulting composite image will depict numerous anatomical features of the head which are of particular diagnostic and therapeutic interest, in particular those in and around the teeth, mandibles, and cervical vertebrae.

In a possible embodiment, the tiles of each slice are uniformly-sized.

The use of a uniform grid for the tile pattern is advantageous in that it allows for an economy of computing resources in the creation of the composite image.

Preferably, the first tile pattern is a 20×25 grid.

Such a grid size strikes an acceptable balance between image quality and computational overhead in most common scanning patterns, and in particular scans of the head and neck.

In another possible embodiment, the tiles are differently-sized according to the anatomical features depicted therein.

When the sizing of the tiles is adapted to the anatomy depicted therein, smaller tiles may be utilized for areas of greater interest and/or presenting intricate, detailed anatomy; while areas of lesser interest and/or having less complexity can be processed using larger tiles. In this way, the efficiency of the creation of the composite image is enhanced.

In a variant embodiment, for at least some of the slices, a focus value is calculated only for tiles proximate to at least one of a pre-determined set of anatomical features of the patient.

This is advantageous in that only the tiles which depict relevant anatomical information are retained for possible selection and inclusion into the composite image, thereby reducing or minimizing the computational load and increasing or maximizing the efficiency of the creation of the composite image.

Preferably, the proximity of anatomical features is determined according to the position of a plurality of at least one radio-opaque marker disposed on the patient.

This is advantageous in that, as the markers are visible in the resulting tomograpical slices, the locations of relevant anatomical features are quickly and easily determined by applying proportional relationships known in human physiology. By applying these locations, the selection of tiles for each slice can be directed, thereby improving the efficiency and performance of the composite image creation.

According to a second aspect, the invention is directed towards a composite image created by the method described above.

Such a composite image will embody the enumerated advantages of the invention.

Preferably, there is provided a bilateral composite image comprising at least two superimposed unilateral composite images.

Such an image is advantageous in that it provides an image similar to a traditional radiograph, but comprising all of the advantages of the tomographic imaging method as described above.

According to a third aspect, the invention is directed towards a cephalometric tracing on a composite image as described above.

This is advantageous in that, as the depth map of the composite image intrinsically contains depth information, the depth of each of the pixels in the composite image can be assigned a depth value according to the corresponding depth map value of the tile in which said pixel is located.

The cephalometric tracing is thereby produced quickly and easily, and with a reduced or minimal amount of additional calculation or processing.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

The present invention can be understood as a series of steps for decomposing a set of tomographic slices, selecting a desirable element or elements from each slice, and then re-assembling the selected elements into a composite picture.

Related art extra-oral dental imaging methods and/or systems can be used to execute the topographic scan process as described herein. Generally, an extra-oral dental imaging system comprises a sensor and an X-ray source mounted on a gantry, which itself can be fastened to a horizontal mount. In one case, the horizontal mount is fixed to a vertical column that may comprise classical telescopic means to allow setting the height of the imaging system.

The extra-oral dental imaging system also comprises a patient holder that maintains the patient head in a defined and fixed position under the gantry, between the X-ray source and the sensor during the imaging process. The X-ray source is adapted to irradiate the object to be imaged, for example, at least a part of a human skull for creating a cephalometric image. The sensor forms an imaging device suitable for producing multiple frames during the exposure of the object to be imaged. The X-ray sensor can be a charge-coupled device (CCD), a CMOS sensor, or a TFT sensor, as such a device could be easily integrated into a computerized imaging system with minimal adaptation.

The gantry forms a manipulator for displacing the sensor and the X-ray source along an exposure profile. Thus, the manipulator or gantry permits the movement of the X-ray source and the sensor by means of a selective translation and a selective rotation. An extra-oral dental imaging system can comprise a Cone-Beam Computerized Tomography (CBCT) technique as known in the art.

Figure 1:
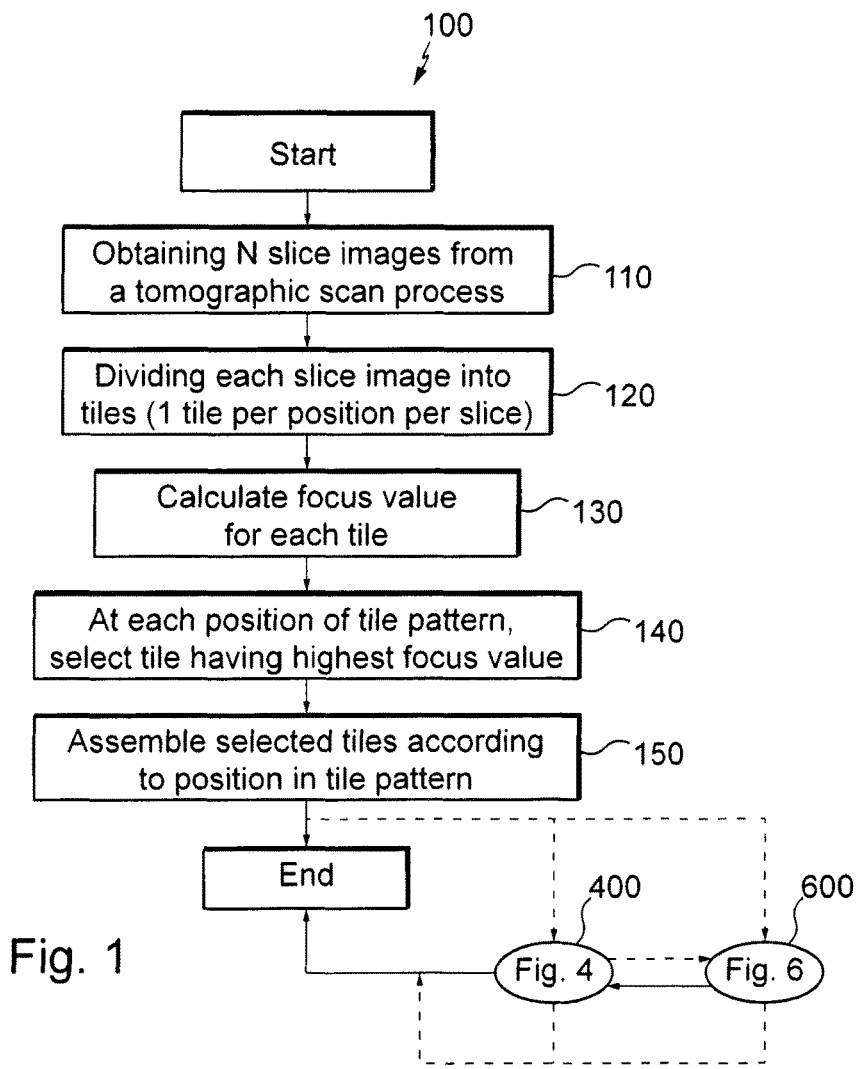
FIG. 1 is a flowchart depicting one method according to an embodiment of the invention.

FIG. 1 is a flowchart depicting an exemplary method 100 for creating a composite cephalometric image, according to the invention.

First, in a step 110, a number N of tomographic slices are obtained in a tomographic scanning process, which comprise three-dimensional volumetric information on the patient's anatomy, with the information in each slice being situated at a certain distance from a reference plane. When this volumetric information is retro-projected through said reference plane (for instance by parallel or cone-beam geometry), a series of N slice images are created.

It will be noted that the number N of slices, and as a result the number N of slice images generated, will depend on a number of factors, including the size and form of the patient's anatomy and the depth resolution at which the slices are generated.

In general, however, the more the slices and the finer their resolution, the higher the quality of the eventual composite image and the greater the amount of computing time and resources required to generate it.

The N slice images are subsequently divided into tiles in a step 120, according to a first tile pattern. The first tile pattern is, in this embodiment, simply a pre-determined grid which is overlaid on each slice image, so as to divide it into a set of tiles. The first tile pattern is applied to each of the slice images uniformly, such that each tile is identical in terms of its dimensions and position as the corresponding, co-positioned tiles in the other slice images.

The first tile pattern can be simply a uniform grid, as here, wherein each of the tiles has the same dimensions; or it may alternatively be configured such that the tiles vary across the tile pattern.

For instance, it may be desirable to utilize a tile pattern where portions of the patient's anatomy which are more intricate or complex are depicted with smaller tiles, and portions where the patient's anatomy is less complex are depicted with larger tiles. This tile pattern selection process will be discussed in greater detail infra, with reference to FIG. 3.

Once the tiles are created, a focus value is calculated for each tile in a step 130.

Different methods for calculating focus values are known in the imaging-processing arts, and the person of ordinary skill will be readily capable of selecting one or several which are appropriate for the circumstances of the application in question.

For instance, in the present embodiment the focus value is in fact the mean of the values produced by two focus value calculations: the Gaussian derivative criteria, and the Tenengrad focus measure. The Gaussian derivative criterion quantifies the gradient magnitude for each pixel, which represents the degree to which the image is in-focus at that pixel. The Gaussian derivative criterion is given by the following equation:

$$F(\sigma) = \frac{1}{MN} \sum_{x,y} [f(x, y) * G_y(x, y, \sigma)]^2 + [f(x, y) * G_y(x, y, \sigma)]^2$$

where M and N are respectively the number of rows and columns of pixels in the image, f(x,y) is the grey value of the pixel at the coordinates (x,y), $G_x(x, y, \sigma)$ and $G_y(x, y, \sigma)$ are the first-order derivatives in the x and y directions for a given standard deviation σ, and * is the convolution operator.

The Tenengrad focus measure extracts the gradient magnitude after a Sobel filter is applied, which is aimed at locating regions of high gradient in the tiles. The Tenengrad focus measure first requires the calculation of Sobel horizontal and vertical operators:

$$I_x = \frac{1}{4}\begin{bmatrix} -1 & 0 & 1 \\ -2 & 0 & 2 \\ -1 & 0 & 1 \end{bmatrix}, I_y = \frac{1}{4}\begin{bmatrix} 1 & 2 & 1 \\ 0 & 0 & 0 \\ -1 & -2 & -1 \end{bmatrix}$$

The Sobel horizontal and vertical operators $I_x$, $I_y$ are then inserted into the following equation to calculate the Tenengrad criterion:

$$S = \Sigma_M \Sigma_N (I_x^2 + I_y^2)$$

The mean of the Gaussian derivative criterion and the Tenengrad criterion is then calculated. This mean is the focus value for that tile; a higher focus value for a particular tile indicates a more in-focus image, and vice-versa.

Of course, it should be understood that other means for calculating focus measures are known in the image-processing arts, and as a result the person of skill in the art will be readily capable of determining which, if any, of these methods would be advantageous to use instead of the method described above.

The composite image may now be assembled. As mentioned above, for each tile position of the first tile pattern, there will be one tile for each slice image. From these, the tile having the highest focus value is retained, in a step 140. For each position of the first tile pattern, therefore, a single, most in-focus tile is selected.

Once this is done a composite image is created, in a step 150, wherein the selected tiles are assembled according to their position in the first tile pattern.

The resulting composite image is thus an assemblage of portions of the slice images, where each part of the image is in focus. The resulting composite image is thus of a much greater diagnostic and therapeutic utility than the individual slice images, in which important anatomical features may be distorted and/or out of focus.

At this point, the composite image may be of sufficient quality to be used directly, at which point the process is complete. Alternatively, additional enhancement steps 400 and 600 may be employed to enhance the image; these steps will be discussed infra with respect to FIGS. 4 and 6.

Figure 2:
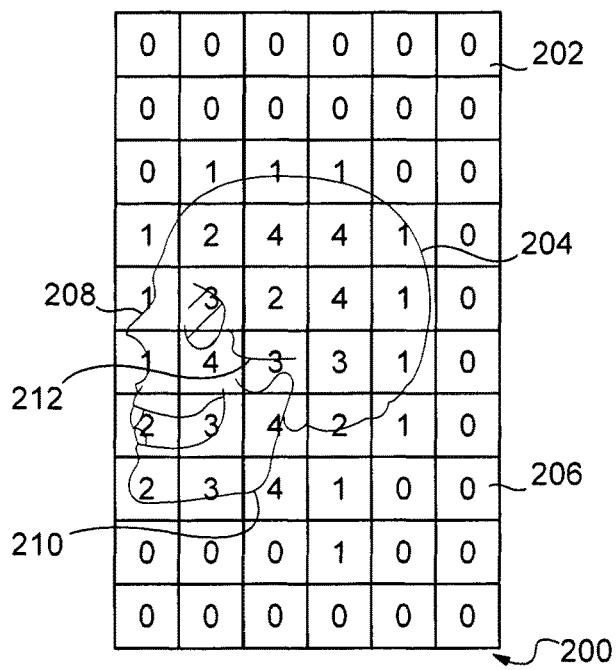
FIG. 2 is one depth map derived from a composite image created by the method of Figure.

Turning now to FIG. 2, an exemplary depth map 200 is shown superimposed on an associated composite image 202. The composite image 202 depicts a cranium 204 (shown here in a simplified form for illustrative purposes), which is a typical application for cephalometric imaging. For the sake of clarity, a number of tiles to the front and back of the patient's cranium 204 are omitted.

The composite image 202 comprises a plurality of tiles 206, upon which the depth map 200 is here superimposed. The depth map 200 is represented by a number positioned on each of the tiles 206. The number in each tile 206 is a depth value, corresponding to the difference in depth between the slice image from which the tile 206 was extracted and the slice image taken along a reference plane.

The first tile pattern is visible in the depth map 200, since the depth map 200 is based on the individual tiles 206 that make up the composite image 202.

In general the depth map may be a uniform grid; in a 20×25 grid is particularly well-adapted for cranial and maxillofacial imaging as it strikes a good balance between composite image quality and computing load. However, in other embodiments the size of the tiles may be variable, so long as the size of each tile is consistent from one slice image to the next.

In the example of FIG. 2, the reference plane is the mid-sagittal (or median) plane, running through the centreline of the cranium. Of course, another plane may be used as the reference plane, for instance as a function of the anatomical features to be imaged and their intended use.

Using a reference plane which is also a plane of anatomical symmetry (such as the mid-sagittal plane) is particularly advantageous in that, by only extracting slice images on one side of said plane, the resulting composite image can be made unilateral.

This will reduce confusion as a result of the superposition of anatomical features that are duplicated on both sides of the plane of symmetry. Thus, problems present on one side of the plane of symmetry will not be obscured by healthy anatomy on the other side.

The depth values of each tile are assigned as a function of the position of the slice from which the tile was extracted relative to a reference plane.

In FIG. 2, for example, a depth value of 0 corresponds to a tile taken from the slice lying in the mid-sagittal plane, a depth value of 1 corresponds to the first adjacent slice in the lateral direction, and so on. Thus, the greater the depth value, the further the separation of the slice from the reference plane and, by extension, the further the anatomical features depicted therein from said reference plane.

This is also illustrated by comparing the image of the cranium 204 with the values of the depth map 200. Structures closer to the midline of the cranium 204 will be depicted in slices having lower depth values; for instance, elements such as the nasion 208, vertebrae (not pictured) and the like are depicted in tiles taken from slices on or near the mid-sagittal plane, while more laterally-positioned features such as the mandibles 210 and the zygomatic bone 212 are depicted in tiles from slices that are further from the mid-sagittal plane.

The composite image therefore has the effect of "flattening" the patient's anatomy; indeed, one of the primary advantages of the invention is that anatomical features present at different depths are presented in the same two-dimensional image with little to no degradations. However, in using the depth map, an approximation of the depth coordinates of a point depicted in the image may nonetheless be obtained, since the depth value corresponds to a position relative to a reference plane.

In this way, a three-dimensional reconstruction of the patient's anatomy may be performed on the basis of the composite image and its associated depth map. It will be readily recognized that using a finer tile pattern will yield a higher-quality reconstruction and a more accurate determination of the depth coordinates for any given point in the image.

Figure 3:
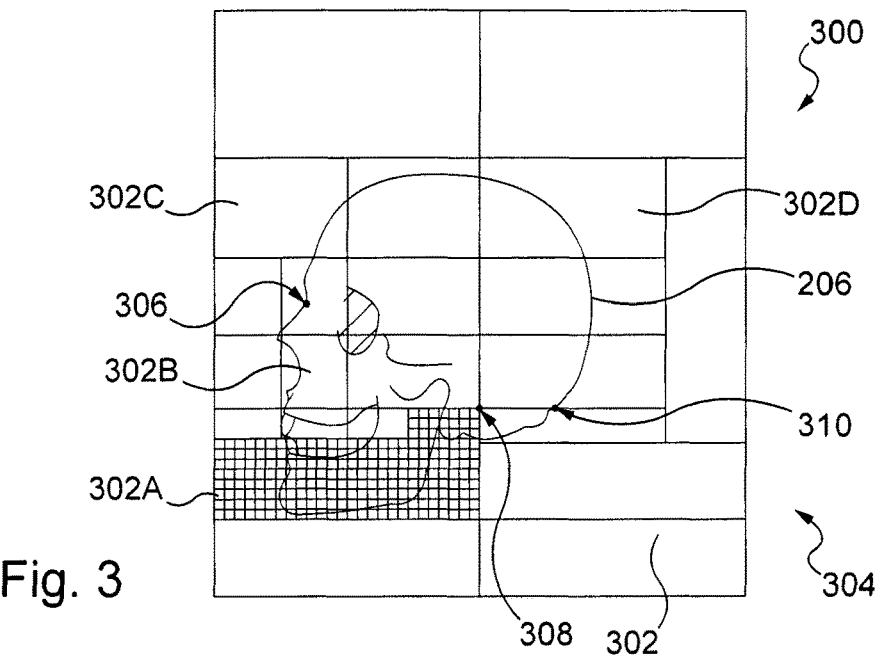
FIG. 3 is an exemplary first tile pattern having a variable tile size.

FIG. 3 illustrates another possible variation, depicting a composite image 300 divided into a plurality of tiles 302 according to a first tile pattern 304. The cranium 204 is the same as that depicted in FIG. 2, and the composite image 300 has the same dimensions as the composite image 200. However, the first tile pattern 304 differs greatly, in that the tiles 302 are of varying sizes.

In many cases, it may be advantageous to use a smaller tile size, and therefore a finer resolution, in areas of the slice images which depict anatomical features which are complex and/or of particular anatomical importance. On the other hand, to avoid wasting computing resources, it might also be advantageous to use a large tile size in portions of the anatomy which are not of great interest or not particularly detailed. By varying the size of the tiles within the first tile pattern, these objectives may be reconciled, striking a balance between quality in the composite image and efficiency in its synthesis.

To facilitate this, it may be desirable to include radio-opaque markers whose presence is visible in the tomographic data, so that one may correct for the orientation and size of the patient's anatomy when preparing the slice images, and better conform the first tile pattern to the patient's anatomy.

In FIG. 3, for instance, there are four markers: an anterior marker 306 disposed on the nasion, two lateral markers 308 each disposed in an ear canal, and a posterior marker 310 disposed on or near the external occipital protuberance at the back of the cranium. In concert, these markers 306, 308, 310 permit not only the determination of the mid-sagittal plane (i.e. the plane which contains both the anterior and posterior markers 306, 310), but also the orientation of the head since only one of the lateral markers 308 will be visible when the mid-sagittal plane is parallel to the slice image.

Moreover, by applying known anatomical relationships, the general size and form of the skull can be determined from measurements taken between the different markers placed on the patient's anatomy. While FIG. 3 depicts the usage of four markers, it may certainly be envisioned that more or fewer markers may be employed, possibly in different locations for different effects.

Also, a great savings in computational resources may be conserved by only calculating focus values for tiles in which anatomical features are known or expected to be present (or, depending on the implementation, returning a non-zero focus value only for such tiles), so as to pre-sort the set of tiles and facilitate the selection of the tiles for incorporation into the composite image. Techniques such as the usage of such radio-opaque markers and known relationships will facilitate this.

Returning now to FIG. 3, it can be seen that since the position of the relevant portions of the facial and cranial anatomy can be so identified and located, the size of the tiles 302 in the first tile pattern 304 varies considerably. For instance, the tiles 302A, which are located around the complex maxillofacial and mandibular anatomy, are smaller than the larger tiles 302B located around the nose and eyes. Larger still are the tiles 302C and 302D, which are located around various portions of the frontal, parietal, and occipital bones.

This customization of the first tile pattern may be performed according to pre-determined templates which are scaled to the dimensions of the patient's anatomy (e.g. measured). Alternatively, the first tile pattern may be generated ad hoc, according to pre-determined general rules, or manually by the doctor or radiologist.

While the composite image generated by the method of FIG. 1 may be sufficient for some applications, some degradations may remain which make its use impracticable. To this end, a step for enhancing the composite image may be implemented.

Figure 4:
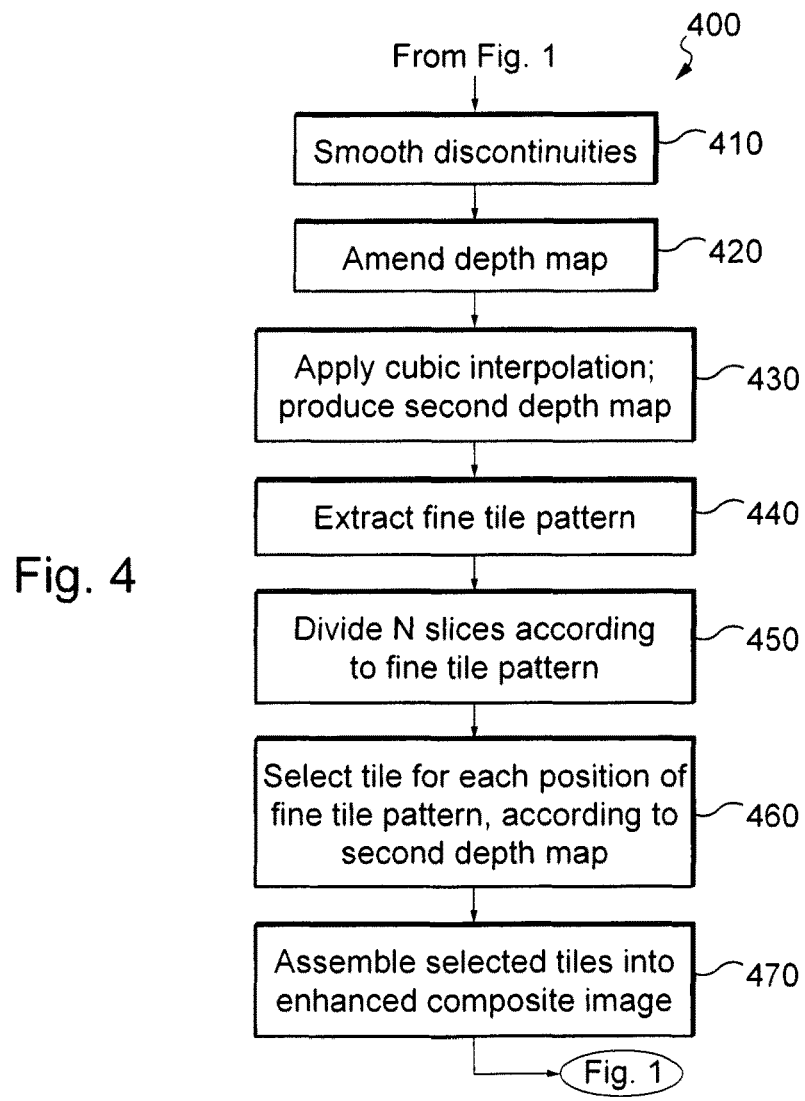
FIG. 4 is a flowchart depicting an optional enhancement step for the method of FIG. 1.

FIG. 4 depicts a possible enhancement step 400, which comprises a number of sub-steps. In a first sub-step 410, discontinuities in the composite image are smoothed, which may be done by applying techniques known in the arts of image processing. The smoothing of the composite image will reduce or eliminate discontinuities therein, enabling further image enhancement. In a second sub-step 420, the depth map is amended to reflect the smoothed composite image.

Following this a cubic interpolation method is applied to the amended first depth map to produce a second depth map, which is represented here in the step 430. As a result of the cubic interpolation, the second depth map has a much finer grid than the first depth map (which is based on the first tile pattern).

From the second depth map, a second tile pattern is extracted, in a fourth sub-step 440. The tiles of the second tile pattern are much smaller than those of the first tile pattern.

Once the second tile pattern is created, it is applied to the N slice images to divide them into a second set of slides, here depicted by the fifth sub-step 450.

However, a tile is preferably not created for every position in the second tile pattern for every slice image. Rather, the depth values for each position of the second depth map are used to extract only one tile for each position in the second tile pattern, forming a second set of tiles, in a sixth sub-step 460.

These tiles in the second set will naturally have the best focus value: the first depth map is based on the focus values of the tiles, and the second depth map smooths and interpolates along the boundaries of the tiles, so as to better conform the depth map to the natural curves of the human anatomy.

The thus-extracted second set of tiles is then assembled into an enhanced composite image according to their position in the second tile pattern, in the seventh sub-step 470. The enhanced composite image will be much smoother and have fewer visual artefacts and defects than the first composite image.

Figure 5:
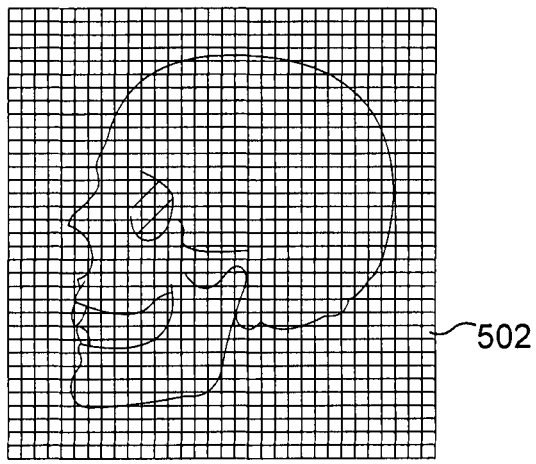
FIG. 5 is an exemplary second tile pattern.

Turning now to FIG. 5, an exemplary second tile pattern 500 is depicted. As can be seen, the second tile pattern 500 is considerably finer than the first tile pattern seen in the depth map 200 of FIG. 2.

It will be recognized that the utility of a fine-grained second tile pattern such as the second tile pattern 500 is at least partially dependent on the number of slice images from which the first set of tiles are created. The greater the number of slices, the greater the effectiveness with which the discontinuities between the tiles can be reduced and the composite image enhanced.

Moreover, while the second tile pattern 500 contains tiles 502 of a uniform size, there is nothing that requires that this be so. Indeed, it can be envisioned that the second tile pattern has a variable tile size, possibly according to the anatomical features depicted therein, as described above.

Figure 6:
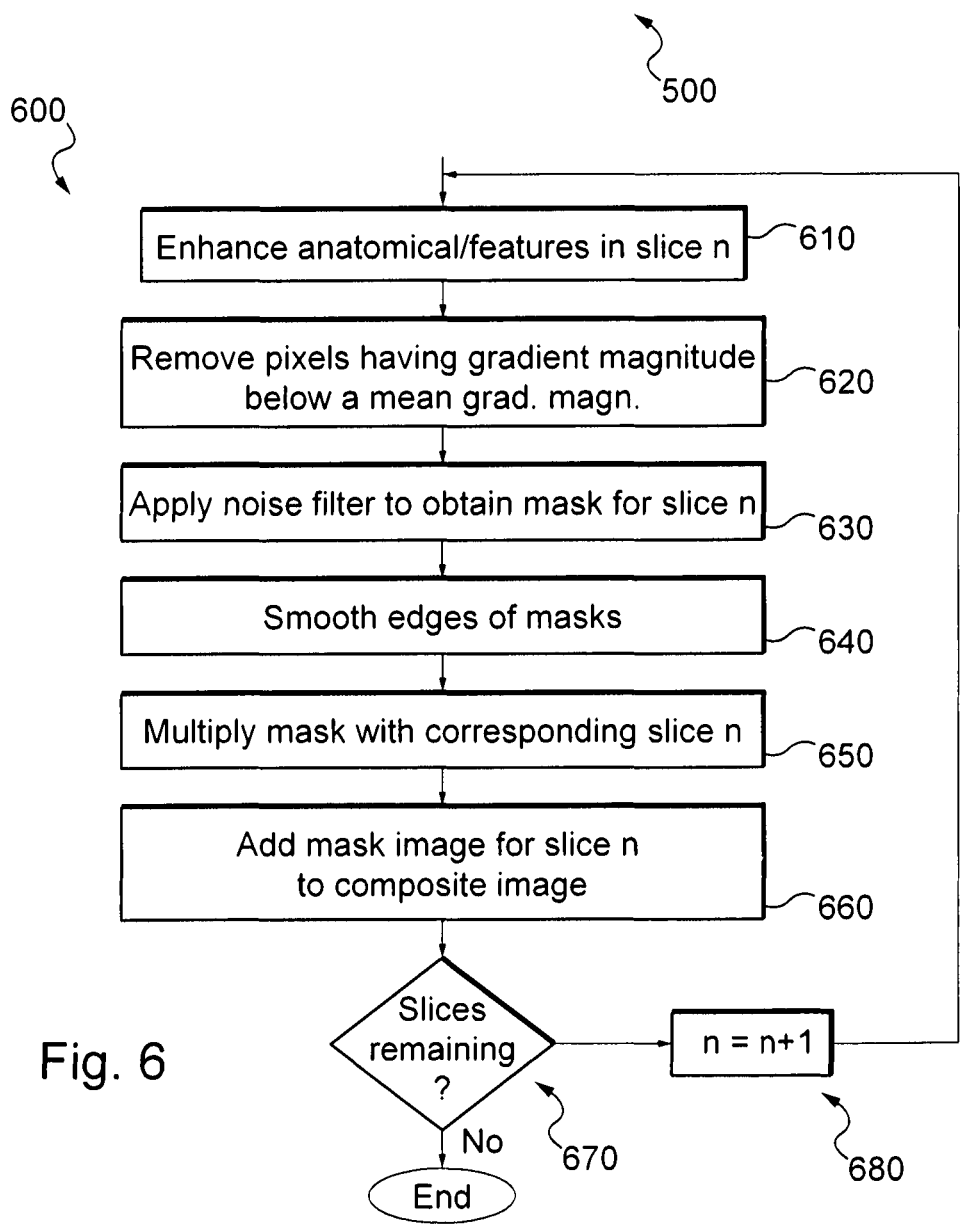
FIG. 6 is a flowchart depicting an optional step for enhancing the composite image by adding obscured anatomical features to the method of FIG. 1.

Turning now to FIG. 6, another step for enhancing the composite image is depicted. A step 600 is directed towards a series of sub-steps which serve to add or enhance the presence in the composite image of anatomical structures that may be hidden or obscured by other anatomical structures which are co-located in the image plane but which are situated in different slices of the tomographic data, or which were most visible in tiles that were discarded as a result of the tile selection process.

For instance, this might include bony processes and other such structures disposed within the cranial cavity (e.g. the sella turcica), which might be obscured in the composite image by external anatomical features.

The adding step 600 comprises a first sub-step 610, in which for one of the N slice images the anatomical features therein are enhanced. This enhancement is performed, in this embodiment, by the application of a Difference of Gaussians filter, which has the effect of emphasizing the edges of features within the image. However, other such enhancement filters are known in the art; the person of skill will be able to determine which, if any, are appropriate for use in this method.

The user has a certain amount of flexibility in applying this enhancement method, in that not all of the slice images created during the tomographic imaging process need necessarily be included in the set of n slice images; indeed, it is generally preferable to limit the size of the set of n slice images in this way. Rather, in certain embodiments, only slice images containing anatomical features that are of interest and known to be obscured behind other anatomical features may be included in the set of n slice images. In this way, computing resources are most efficiently utilized. Thus, it should be understood that in the following the n slice images being used for the enhancement method are a sub-set of the N total slice images, where n≤N.

Next, the slice image is treated so as to remove pixels that have a gradient magnitude below a mean gradient magnitude of the image, in a second sub-step 620. The gradient magnitude is calculated by the application of a Sobel filter, as explained above A noise filter is then applied to the treated slice image n to obtain a mask, in a sub-step 630. The noise filter is preferably a morphological operation, as such are particularly well-suited to human anatomy, but in any case will serve to eliminate noise that is present in the treated slice image.

The edges of the mask are then smoothed to eliminate any discontinuities in the contours thereof, as seen in a sub-step 640. The smoothing may be performed by the application of a known algorithm, for instance a Difference of Gaussians. Whichever algorithm is used, the smoothing ensures that no discontinuities or degradations are re-introduced when the mask is used in subsequent steps.

The mask so obtained thus highlights the portions of the slice image from which it was prepared that are particularly in-focus; these in-focus portions also happen to be those which are of interest for this enhancing step 600.

When the mask is multiplied with the corresponding slice image for the slice n, the anatomical features that are in focus within that slice are retained in the resulting contour image. This is seen in the sub-step 650 of FIG. 6. Thus, by adding the contour image for the slice n to the composite image, as in a sub-step 660, the previously-obscured anatomical features that were present in that slice are now present in the composite image, without causing any degradation or lack of clarity in the latter.

The adding sub-step 660 preferably comprises an additional condition, wherein only pixels that are not present in the contour image for any other slice are added to the composite image. The implementation of this is flexible and will depend on the implementation of the sub-step (for instance, whether the contour images are determined and added to the composite image one-by-one, or calculated for every slice before being added to the composite image together). In this way, over-magnification and degradation of the images is avoided, in that pixels present in more than one contour image are not over-emphasized.

This enhancement step must be performed for all of the slice images in question; thus, in sub-steps 670 and 680 there is described a method for iterating the method. In the sub-step 670 the presence of remaining slice images will cause the method to be repeated for the next slice in the series. Sub-step 680 merely represents an incrementation of the slice index.

It will be noted that two enhancement steps—the enhancement step 400 of FIG. 4 and the enhancement step 600 of FIG. 6—are described herein as optional means for improving the composite image created by the method. In particular it will be noted that the composite image may be first passed through one, the other, both enhancement steps, or neither, in no particular order. It may also be envisioned that other methods for enhancing the composite image may be employed, and the person of skill in the art will be readily capable of recognizing which such methods are appropriate and of putting them into effect.

Moreover, since each contour image comes from a single slice of the tomographic data, depth information for the pixels contained therein can be retained. This makes it possible to use the composite image as mentioned above, in that correct depth information can therefore be determined for each pixel of the composite image.

For diagnostic and/or therapeutic uses, it may be particularly useful to create a bilateral composite image. Such a composite image is actually a combination of two unilateral composite images, and as such will approximate the image generated by traditional methods but with the advantages brought by the tomographic process.

Moreover, the composite image (whether unilateral or bilateral) can be used as the basis for a cephalometric tracing. As the composite image retains depth information, whether through the depth map alone or in combination with depth information associated with one or more contour images, the composite image can quickly and easily be used to create a cephalometric tracing that is well suited for diagnostic and/or therapeutic uses.

According to embodiments of this application, a computer program has stored instructions that process image data accessed from an electronic memory in accordance with methods/embodiments described. As can be appreciated by those skilled in the image processing arts, a computer program of embodiments of this application can be utilized by a suitable, general-purpose computer system, such as a personal computer or workstation. However, many other types of computer systems can be used to execute the computer program embodiments, including networked processors. The computer program for performing method embodiments may be stored in a computer readable storage medium. This medium may comprise, for example; magnetic storage media such as a magnetic disk (such as a hard drive) or magnetic tape; optical storage media such as an optical disc, optical tape, or machine readable bar code; solid state electronic storage devices such as random-access memory (RAM), or read-only memory (ROM); or any other physical device or medium employed to store a computer program. The computer program for performing embodiments may also be stored on computer readable storage medium that is connected to the image processor by way of the internet or other communication medium. Those skilled in the art will readily recognize that the equivalent of such a computer program product may also be constructed in hardware.

It will be understood that the computer program product of this application may make use of various image manipulation algorithms and processes that are well known. It will be further understood that the computer program product embodiments may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product embodiments, are not specifically shown or described herein and may be selected from such algorithms, systems, hardware, components and elements known in the art.

It should be understood that various changes and modifications to the presently preferred embodiments described herein will be apparent to those skilled in the art. In addition, while a particular feature of the invention may have been disclosed with respect to only one of several implementations or embodiments, such feature can be combined with one or more other features of the other implementations or embodiments as is desirable and advantageous for any given or particular function.

Such changes and modifications can be made without departing from the spirit and scope of the present invention and without diminishing its attendant advantages. It is therefore intended that such changes and modifications be covered by the appended claims.

Naturally, to satisfy specific needs, the person of skill in the art will be capable of modifying the structures and methods of the preceding description.

The invention claimed is:

1. A method for creating a composite image from a plurality of tomographic slices oriented parallel to and at varying distances from a reference plane, comprising the steps of:
   projecting each slice to create a plurality of two-dimensional slice images;
   dividing each slice image into a first set of tiles according to a pre-determined first tile pattern;
   calculating a focus value for each tile of each slice image;
   selecting, for each position of said first tile pattern, one of said first set of tiles having the highest focus value;
   assembling the composite image from said selected tiles;
   generating a first depth map from depth values of the selected tiles constituting the composite image;
   smoothing discontinuities on the composite image;
   amending the first depth map to reflect the smoothed composite image;
   applying a cubic interpolation to the amended first depth map to produce a second depth map;
   extracting a second tile pattern from the second depth map;
   dividing each of the plurality of slices into a second set of tiles according to said second tile pattern;
   selecting, for each position in the second tile pattern, one of said second set of tiles according to the second depth map; and
   assembling an enhanced composite image from said selected tiles of said second set of tiles.

2. A method for creating a composite image from a plurality of tomographic slices oriented parallel to and at varying distances from a reference plane, comprising the steps of:
   projecting each slice to create a plurality of two-dimensional slice images;
   dividing each slice image into a first set of tiles according to a pre-determined first tile pattern;
   calculating a focus value for each tile of each slice image;
   selecting, for each position of said first tile pattern, one of said first set of tiles having the highest focus value;
   assembling the composite image from said selected tiles;
   applying an enhancement filter to at least one slice image to enhance anatomical features in the at least one slice image, thereby producing a working image;
   removing pixels from the working image having a gradient magnitude below a mean gradient magnitude of said at least one slice image;
   applying a noise filter to said working image, thereby obtaining a mask;
   applying a smoothing filter to smooth the edges of the mask;
   multiplying the mask and the at least one slice image, thereby producing a contour image; and
   adding the contour image to the composite image.

3. The method according to claim 2, wherein each at least one slice image contains at least one of a pre-determined set of anatomical features.

4. The method according to claim 2, wherein the contour image produced for each slice comprises only pixels not present in the contour image of any other slice.

5. The method according to claim 2, wherein the noise filter is a morphological operation.

6. The method according to claim 2, wherein at least one of the enhancement filter and smoothing filter is a Difference of Gaussians filter.

* * * * *